(12) United States Patent
Van Breemen

(10) Patent No.: US 7,124,713 B2
(45) Date of Patent: Oct. 24, 2006

(54) ANTI-CRIBBING DEVICE

(76) Inventor: Sylvia C. Van Breemen, 404 Breemen Cir., Lafayette, LA (US) 70508

( * ) Notice: Subject to any disclaimer, the term of this patent is extended or adjusted under 35 U.S.C. 154(b) by 17 days.

(21) Appl. No.: 11/059,995

(22) Filed: Feb. 17, 2005

(65) Prior Publication Data
US 2006/0180096 A1    Aug. 17, 2006

(51) Int. Cl.
*A01K 15/04* (2006.01)

(52) U.S. Cl. ...................... 119/821; 119/833

(58) Field of Classification Search ........ 119/821–833, 119/814, 759, 800, 866, 712, 905, 908; 54/71, 54/7, 8, 1; 128/863; 433/1; *A01K 15/04*
See application file for complete search history.

(56) References Cited

U.S. PATENT DOCUMENTS

| | | | | | |
|---|---|---|---|---|---|
| 267,989 | A | * | 11/1882 | Deeds | ..................... 119/833 |
| 287,577 | A | * | 10/1883 | Quinque | ..................... 119/833 |
| 505,590 | A | * | 9/1893 | Burvill-Holmes | ........... 119/833 |
| 816,194 | A | * | 3/1906 | Teeter | ......................... 119/866 |
| 1,598,902 | A | * | 9/1926 | Warner | ....................... 119/830 |
| 2,844,142 | A | * | 7/1958 | Gibbons | ..................... 600/240 |
| 3,462,838 | A | * | 8/1969 | Alstergren | ..................... 433/1 |

FOREIGN PATENT DOCUMENTS

GB    2086730 A  *  5/1982

* cited by examiner

Primary Examiner—Andrea M. Valenti
(74) Attorney, Agent, or Firm—Keaty Professional Law Corporation

(57) ABSTRACT

An anti-cribbing device for horses uses a member, which is placed in the mouth of the horse by piercing through the gum above the front teeth. The member extends forward of the front teeth and prevents the horse from applying force on the front teeth, when attempting to crib.

4 Claims, 2 Drawing Sheets

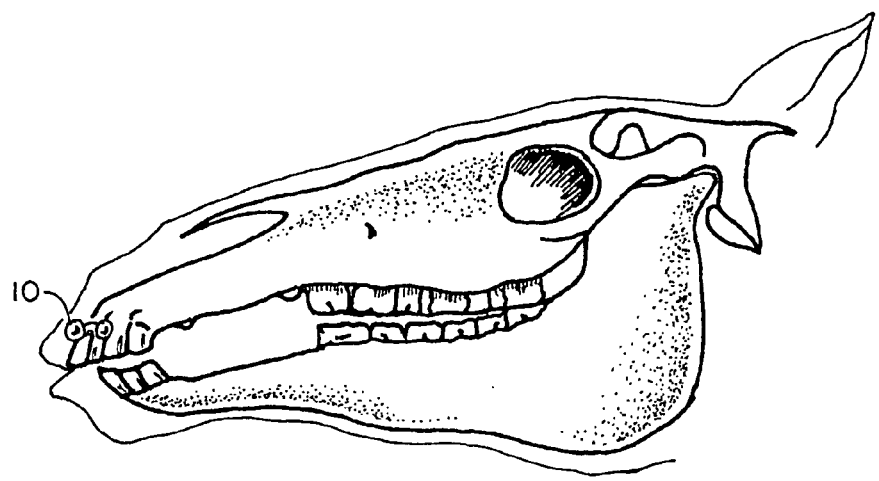
F I G. 6
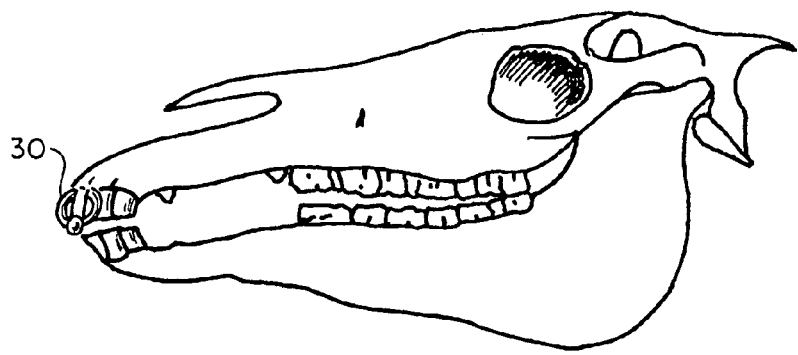
F I G. 7
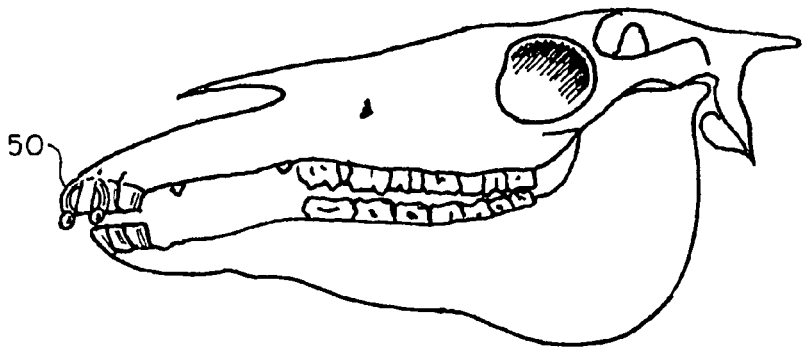
F I G. 8

ANTI-CRIBBING DEVICE

BACKGROUND OF THE INVENTION

The present invention relates to a device for breaking a horse from a harmful habit, such as cribbing.

Cribbing and wind sucking are some of the dangerous and harmful habits in horses. Cribbing occurs when the horse grabs a stationary object, such as a stall wall, fence and the like, arches his neck and then pulls backwards. This behavior is usually accompanied with the horse gulping air, which is often referred to as wind sucking or aerophagia. The horse grips the stationary object with the front teeth, eventually wearing down the teeth. If not fixed and corrected, the habit can result in premature wearing down of the teeth, which will prevent the horse from normal eating, potential weight loss, and associated loss of condition.

Wind sucking results with the horse gulping air, which flows into the digestive tract and may cause colic. Because of the dangers associated with cribbing and wind sucking, some insurance companies refuse to insure horses known for this harmful habit.

Various methods have been proposed to solve the problem in an attempt to catch it early, before it becomes an established habit. One of the current solutions is to use the so-called "cribbing collar" which is made of different materials. The cribbing collar is placed on the horse's throat and then the collar is pulled snug and buckled. The pressure is applied on the muscles of the neck when horse opens its mouth too wide; the collar is designed to prevent the horse from gulping the air into the digestive track. The collar solution is moderately successful as long as the collar is in place. The collar becomes a nuisance to the handler/owner because it must be taken on and off every time the horse is ridden or is directed to perform in any way. Additionally, the strap can pose a danger to the horse if it is caught on any object as it may cause strangulation or panic in the animal. For these reasons, the use of the cribbing collar is not recommended for pasture use. Therefore, anytime the horse is not wearing the cribbing collar, it will continue to crib on fences, stalls, trees, and the like. Furthermore, the collar may cause scarring and disfigurement to the horse's throat and poll after a prolonged use.

Another known solution is to use a muzzle, which is placed over the horse's face and prevents the horse from touching the object. The muzzle must also be removed for eating, performing, pasture time, and the like. Similar to the collar, the muzzle works only when it is worn. The straps of the muzzle may cause scarring and disfigurement to the horse's throat and poll area after prolonged use.

A drastic solution is offered by a surgery, which is performed under general anesthesia and involves removing a portion of the omohyoideous, sternohyoideous, and the sternothyroideus muscles. In addition, a portion of the ventral branch of the spinal accessory nerve is removed, which denervates the sternocephalicus muscle. This type of surgery is fairly common and nationally recognized as an anti-cribbing procedure. While there are no published side effects associated with this procedure, there are dangers associated with any surgery, such as anesthetic complications and the chance for infection. The surgery procedure is more successful in horses that have been cribbing a relatively short period of time or in horses who do not crib constantly.

The present invention contemplates elimination of drawbacks associates with the conventional methods and provision of an anti-cribbing device that is simple to use and free of side effects, which are often the result of conventional anti-cribbing methods.

SUMMARY OF THE INVENTION

It is therefore an object of the present invention to provide an anti-cribbing device for breaking the harmful habits in horses.

It is another object of the present invention to provide an anti-cribbing device that can be left in place for a prolonged period of time without the necessity to remove it when the horse changes its activity.

These and other objects of the invention are achieved through a provision of an anti-cribbing device that is configured for positioning in the mouth of a horse through a hole pierced in the gum above the front teeth. The anti-cribbing device comprises a sturdy member made of surgically safe material, such as for instance surgical steel. The member has a central portion that is placed through the pierced opening and configured to extend in front of the front teeth of the horse.

To prevent the horse from dislodging the anti-cribbing member, an enlarged portion is secured to the central portion. The enlarged member may a single member threadably engageable to opposing free ends of a generally ring-shaped central member. In other embodiments, there can be two enlarged portions, each secured to opposing free ends of the central portion.

Once positioned in the mouth and locked with the assistance of the enlarged portion(s), the anti-cribbing device creates a discomfort for the horse every time the horse tries to apply strong force to the front teeth. The anti-cribbing device of the instant invention remains in place without interfering with normal eating or drinking of the horse.

BRIEF DESCRIPTION OF THE DRAWINGS

Reference will now be made to the drawings, wherein like parts are designated by like numerals, and wherein

FIG. 6 is a schematic side view of the horse's jaws showing position of the anti-cribbing in accordance with the first embodiment of the present invention.

FIG. 7 is a schematic view of the horse's jaws illustrating positioning of the anti-cribbing device in accordance with the second embodiment of the present invention.

FIG. 8 is a schematic view of the horse's jaws illustrating positioning of the anti-cribbing device in accordance with the third embodiment of the present invention.

DETAILED DESCRIPTION OF THE PREFERRED EMBODIMENT

Figure 1:
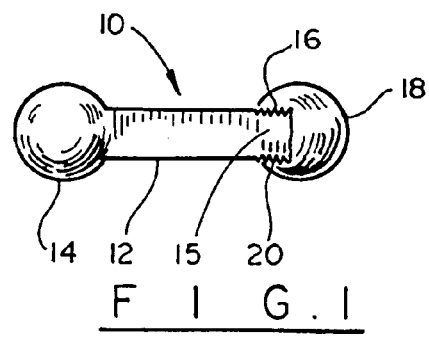
FIG. 1 is a perspective view of the anti-cribbing device in accordance with the first embodiment of the present invention.

Turning now to the drawings in more detail, reference numeral 10 identifies an anti-cribbing device in accordance with the first embodiment of the present invention. As can be seen in the drawings, the device 10 comprises a member having an elongated generally cylindrical central portion 12 having an enlarged spherical portion 14 secured on one of its free ends. The enlarged portion 14 has a greater diameter than the central elongated portion 12. An opposite end 15 of the central portion 12 is provided with external threads 16. A second enlarged member 18 is provided with internal matching threads 20 suitable for engaging with the threads 16. The second enlarged portion 18 is detachably secured to the elongated portion 12. The device 10 can be made from a number of suitable materials, for instance stainless steel or surgical steel or other suitable strong, non-yielding non-reactive material.

The anti-cribbing device in accordance with the first embodiment of the present invention is positioned in the mouth of the horse between the front teeth. One of the preferred methods of inserting the device 10 is by piercing a hole through the gum of the horse at or above the gum line of the front teeth. The exact location of the anti-cribbing device is vastly dependent on the severity of the cribbing habit. It is envisioned that the location designated by numeral 1 in FIG. 5 will be used for mild cribbing, locations designated by numeral 2 on opposite sides of the central location may be used for moderate cribbing and the locations designated by numeral 3 in FIG. 5 can be used for severe cribbing.

Figure 5:
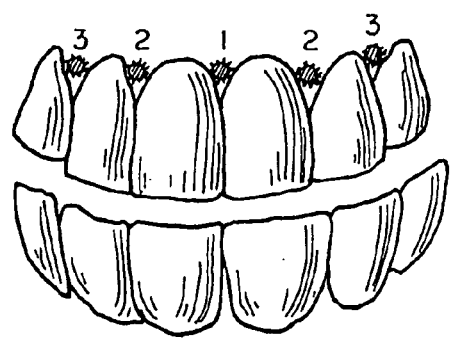
FIG. 5 is a schematic view of the front teeth of the horse's mouth showing alternative locations for inserting the anti-cribbing device of the present invention.

When positioning the device 10, a surgeon first pierces a hole through the gum of the horse in a desired location 1, 2, or 3 as shown in FIG. 5. The piercing may be done after a local anesthetic has been administered. In some cases the horse may be sedated, as well. After an opening is formed by the piercing needle, the surgeon inserts the end 15 of the central portion through the created opening. The central portion is moved to extend forward of the front upper teeth of the horse, and the second enlarged member 18 is threadably engaged to the end 15, thereby ensuring that the device 10 is not dislodged during eating or chewing. As can be seen in FIG. 6, the second end 15 with the detachable second enlarged member 18 of the device 10 protrudes outside of the teeth line and prevents the horse from pushing on the front teeth. An attempt to exert downward force will cause discomfort, thereby breaking the cribbing habit.

Figure 2:
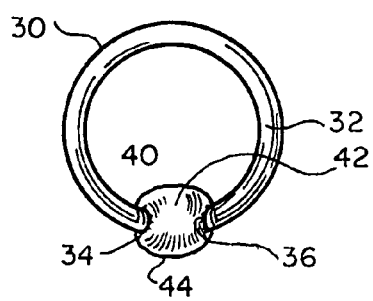
FIG. 2 is a perspective view of the anti-cribbing device in accordance with the second embodiment of the present invention.

FIG. 2 illustrates the second embodiment of the anti-cribbing device in accordance with the present invention. As can be seen in the drawing, the device of the second embodiment is designated by numeral 30. The device 30 comprises a split ring central portion 32 having the first end 34 and a second end 36. Both ends 34 and 36 carry external threads 40, 42, respectively.

A single enlarged portion 44 is provided with an opening, which carries internal threads on diametrically opposite ends thereof. The internal threads formed in the opening (not shown) of the enlarged member 44 match the threads 40 and 42 of the split ring 32. The anti-cribbing device 30, similar to the anti-cribbing device 10 is made from surgically safe material, for instance surgical steel. The central portion 32 has a circular cross-section to minimize discomfort in the pierced opening of the gum.

Before positioning the device 30 in the mouth of the horse, the surgeon removes the enlarged portion 44, leaving the ends 34 and 36 exposed. The surgeon then pierces the gum at a location selected for better addressing the cribbing problem. The location can be any of the positions indicated by numerals 1, 2, or 3 shown in FIG. 5. After administering a proper anesthetic and/or sedation, the surgeon then pierces the gum in the desired location and threads one of the ends 40 or 42 through the pierced opening. Once the split ring 32 is threaded through the opening, the enlarged portion 44 is engaged with the ends 34 and 36, thereby locking the anti-cribbing device 30 in the mouth.

As shown in FIG. 7, the diameter of the split ring 32 is selected to be large enough to ensure that a portion of the ring portion 32 extends forward of the forward teeth of a horse. When properly positioned, the device 30 extends from at or near the gum line of the horse to about the lower edge of the front teeth. If the horse attempts to crib a fence or a stall wall, the device 30 will press on the gum and cause discomfort, thereby breaking the dangerous habit of the horse.

Figures 3, 4:
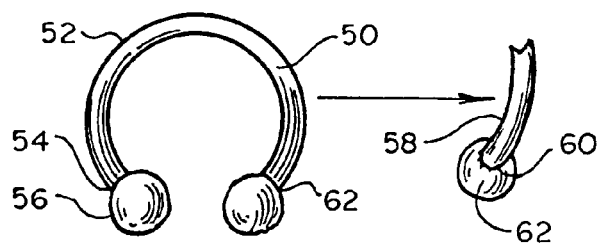
FIG. 3 is a perspective view of the anti-cribbing device in accordance with the third embodiment of the present invention.
FIG. 4 is a detail view of the third embodiment of the present invention showing a threadable engagement of an enlarged portion.

FIG. 3 illustrates the third embodiment of the anti-cribbing device of the present invention. The anti-cribbing device 50 of the third embodiment comprises an arcuate central portion 52, which is formed as an arc or an incomplete circle. One end 54 of the arched member 52 carries a first enlarged portion 56. A second end 58 of the central portion 52 is provided with external threads 60. A second enlarged portion 62 is provided with an opening having internal threads, which match the external threads 60 (see, FIG. 4). Similar to the devices 10 and 30, the device 50 is formed from surgically safe materials that are designed to minimize the possibility of infection once placed in the mouth of a horse.

The size of the central portion 52 depends on the size of the jaw and the front teeth of the horse. The central portion is configured to extend from at or near the gum line to a position forward of the front teeth and below the lower edge of the front teeth, as can be seen in FIG. 8.

The procedure for introducing the anti-cribbing device 50 is similar to the above described procedures. A surgeon removes the second enlarged member 62 from its engagement with the end 58. After administering the necessary anesthetic and/or sedation, the surgeon pierces the gum with conventional piercing tools and then inserts the free end 58 of the device 50 through the created pierced opening. Once central portion 52 is moved to extend forward of the front teeth, the second detachable enlarged portion 62 is attached by engaging the threads 60. As a result, the anti-cribbing device 60 becomes locked in the mouth in the horse.

The location of the device 50 is selected similar to the principles identified above in relation to positions in FIG. 5: position number 1 for mild cribbing, position number 2 for moderate cribbing and position number 3 for severe cribbing. The device 50, similar to devices 10 and 30, tends to cause discomfort when the horse pushes on the front teeth and tries to grab at the fence or a tree.

The devices 10, 30 and 50 are configured for extending forward from the teeth of the horse, thereby preventing cribbing or chewing by the front teeth. At the same time, the normal chewing which is performed by the back teeth of the horse is not affected, thereby not interfering with the normal eating habits of the horse. The devices 10, 30, and 50 form a guard against the pressure applied to the front teeth associated with cribbing. When the horse attempts to crib upon a fence or an enclosure, the pressure applied to the gums through the members 10, 30, and 50 discourages the horse from cribbing.

The devices 10, 30 and 50 do not need to be removed from the mouth of a horse; they can be left for a prolonged period of time or until such time as the horse is broken from cribbing.

Many changes and modifications can be made in the design of the present invention without departing from the spirit thereof. I therefore pray that my rights to the present invention be limited only by the scope of the appended claims.

I claim:

1. A method of breaking a horse from a cribbing habit, comprising the steps of:
- providing a member having a central portion and at least one enlarged portion;
- piercing an opening in a gum of a horse at or near a front teeth gum line of the horse;
- inserting the central portion through the pierced opening such that at least a part of the central portion extends forward of the front teeth; and
- securing the enlarged portion on the central portion, thereby preventing dislodging of the member from a mouth of the horse.

2. The method of claim 1, wherein said central portion has an elongated cylindrical configuration, said enlarged portion is mounted on a first free end of the central portion and further comprising a second enlarged portion detachably securable on a second free end of the central portion, and wherein said first enlarged member is positioned inside the mouth of the horse once the device is inserted in place.

3. The method of claim 1, wherein said central portion has a generally split ring configuration, and said enlarged member is detachably mounted between free ends of the central portion.

4. The method of claim 1, wherein the central portion has a generally arcuate configuration, with the central portion having a first and a second opposing free ends, with the enlarged portion being mounted on a first free end, and further comprising a second enlarged portion mounted on a second free end of the central portion.

* * * * *